Aug. 2, 1966 F. J. TREBBY ET AL 3,264,404
POWER TRANSMISSION CABLE
Filed March 26, 1964 3 Sheets-Sheet 2

INVENTOR.
LUDWIG F. ROEHMANN
FRANCIS J. TREBBY
BY ALEXANDER N. SHEALY

ATTORNEY

Aug. 2, 1966  F. J. TREBBY ETAL  3,264,404
POWER TRANSMISSION CABLE

Filed March 26, 1964  3 Sheets-Sheet 3

INVENTOR.
LUDWIG F. ROEHMANN
FRANCIS J. TREBBY
BY  ALEXANDER N. SHEALY

ATTORNEY

Patented August 2, 1966

3,264,404
POWER TRANSMISSION CABLE
Francis J. Trebby, deceased, late of Spokane, Wash., by Claudine J. Trebby, executrix, Spokane, Wash., and Ludwig F. Roehmann, Spokane, Wash., and Alexander N. Shealy, Newark, Ohio, assignors to Kaiser Aluminum & Chemical Corporation, Oakland Calif., a corporation of Delaware
Filed Mar. 26, 1964, Ser. No. 358,970
4 Claims. (Cl. 174—130)

This invention relates to electrical conductors and particularly to electrical conductors that are constructed to attenuate radio frequency transmission.

Interference with radio broadcast reception is an important consideration in power transmission. Radio frequency currents may originate in power transmission circuits from many sources. For example, when a critical voltage gradient is exceeded at the conductor surface, corona discharges will originate on rough spots, scratches, etc., which act as noise generators in the radio frequency range. Even in low voltage transmission, radio frequencies from such sources as poorly bonded pole hardware, faulty fuses or arcing in any part of the circuit create radio frequency currents which are transmitted by power transmission cables and may interfere with radio reception far from their source.

At present, radio frequency interference is maintained within acceptable limits by means which tend to minimize the source of such currents. Designing to keep the surface voltage gradient below the critical value by such means as using large diameter conductors or bundle conductors is employed as well as avoiding surface irregularities by tension stringing, or pulling conductors through a smoothing die during the erection of transmission lines.

The present invention provides a power transmission conductor that is constructed to attenuate radio frequency energy without substantially affecting the ability of the conductor to transmit power frequency energy. While the conductor of this invention will not in all cases lessen interference at its origin, radio noise that is generated by any means will be attenuated over a short length of conductor rather than transmitted so that it may interfere with radio reception.

The conductor of this invention takes advantage of the phenomenon referred to as "skin effect" which is the tendency for high frequency currents to travel in the skin or outer zone of a conductor while power frequency currents travel through the entire cross section. In accordance with this invention, a conductor is provided with a core or main body of highly conductive material and a skin or outer layer with a relatively high resistivity. By this means, the radio frequency flowing in the skin will be converted to heat and thereby dissipated along a short length of the conductor while the power frequency current travelling through the entire cross section of the conductor will be affected very little if at all.

The resistivity and thickness of the skin are selected so that substantially all of the radio frequency currents will flow in the skin. If the skin has too high resistivity, radio frequency currents will flow in the main body of the conductor beneath the skin, and if the skin is too thin, radio frequency currents will only partly travel through the skin and will not be attenuated to the desired degree. It is to be understood, therefore, that in calculating the skin thickness that is employed, consideration must be given to the resistivity of the skin material and to the frequency which one desires to attenuate.

Similarly, the resistivity of the skin may not be too great and should be at the most 60% as conductive as the main body but generally not less than 10% as conductive. The skin employed in the conductor of this invention cannot be an insulator or it will not accomplish the objective of the invention. The skin must be a conductive material, but it must offer sufficient resistance to the flow of electric current so that small amounts of current will be dissipated within a short length of conductor.

In addition to attenuating radio interference, the high resistivity skin of the conductor may be selected to improve other properties of the conductor. For example, the skin material may increase surface hardness, may increase the overall strength of the conductor and may improve the surface voltage gradient characteristics and the emissivity characteristics of the conductor.

Preferably, the conductors employed in the present invention will comprise aluminum or aluminum alloys. However, any conductive material may be employed. The main power frequency conducting core portion of the conductor of this invention may be aluminum of electrical conductor grade, aluminum alloys of electrical conductor grade, copper, silver, copper alloys, and the like. The high resistivity skin may be aluminum alloys, copper alloys, zinc, other metals or even organic materials which have been modified as by loading with carbon to provide the proper degree of resistivity. The composition of such organic skin materials may even be varied to provide any degree of resistivity, thereby providing a means to tailor a conductor to its environment. The skin may be applied to a conductor by cladding, welding, plating, extruding about the conductor, spraying, dipping or painting as long as electrical continuity is maintained. The skin and conductor may even be diffused into each other so that no sharp interface is apparent in cross section.

A preferred embodiment of this invention employs an aluminum conductor of electrical conductive grade having an IACS rating of about 61% about which is clad a high resistivity aluminum alloy, such as the alloy identified by the Aluminum Association as No. 5056 which has a conductivity of about 29% (said percentages based on an equal volume of the International Annealed Copper Standard).

The conductor of this invention may best be described in conjunction with the accompanying drawings which illustrate various embodiments of this invention and are intended as being illustrative of the invention rather than limiting its scope, wherein FIG. 1 illustrates a cross-sectional view of the simplest form of a conductor embodying this invention;

Figure 1:
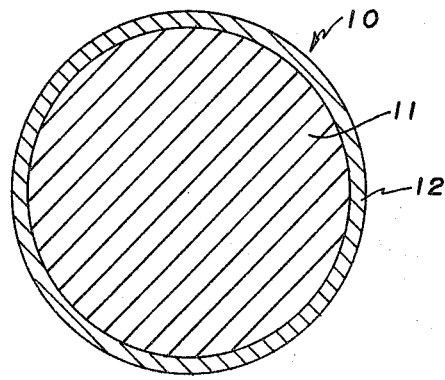

Referring to the conductor illustrated in FIG. 1, there is shown a conductor generally designated as 10 having a core or main body 11 and a skin 12. The core 11 is a low resistivity conductor while the skin 12 is a relatively high resistivity conductor bonded in electrical continuity to the core 11 and completely surrounding it. Although the embodiment pictured in FIG. 1 embodies the invention herein, the invention will be more commonly employed in high power transmission cables with multiple strands as illustrated in the subsequent figures. For example, in FIG. 2 there is shown a 7-strand conductor which is normally in the form of a twisted wire rope. The inner strands 13 are electrical conductor grade aluminum or other metal. The central strand 15 may be electrical conductor grade metal or it may be steel, galvanized steel, high strength aluminum alloy or other material provided to contribute strength to the cable but no significant electrical conductivity. The cable is completely surrounded by a continuous skin 16 of relatively high resistivity, which skin will normally carry and attenuate all radio frequency transmissions originated in the cable itself or in associated equipment.

Figure 2:
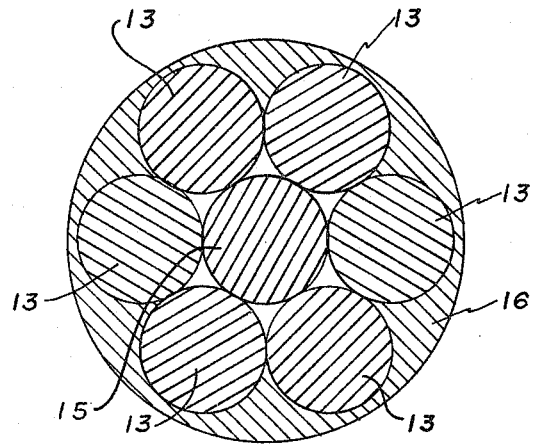
FIG. 2 illustrates a cross-sectional view of a multistrand conductor embodying this invention.
Figure 3:
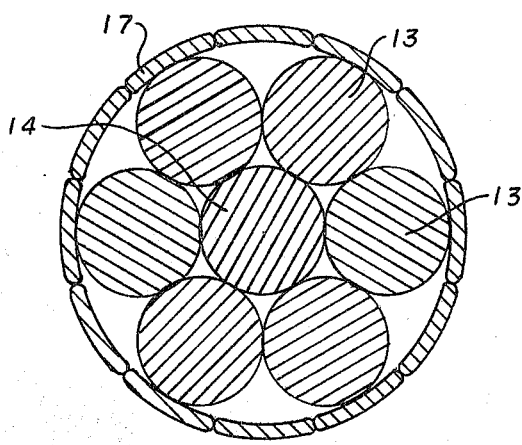
FIG. 3 illustrates a cross-sectional view of another multistrand conductor embodying this invention.

The embodiment illustrated in FIG. 3 shows another multi-strand cable containing inner conductor strands 13 and a central strand 14 which may or may not be a conductor as described with reference to FIG. 2. In the embodiment of FIG. 3, a continuous ribbon 17 of relatively high resistivity is wrapped around strands 13, preferably in a spiral wound opposite to the direction that strands 13 are wound. Preferably also, the ribbon 17 is wrapped so that adjacent windings are in edge contact with each other, although even without such edge contact electrical continuity will exist and radio frequencies travelling through the skin 17 will be attenuated in a short length of conductor cable.

Figure 4:
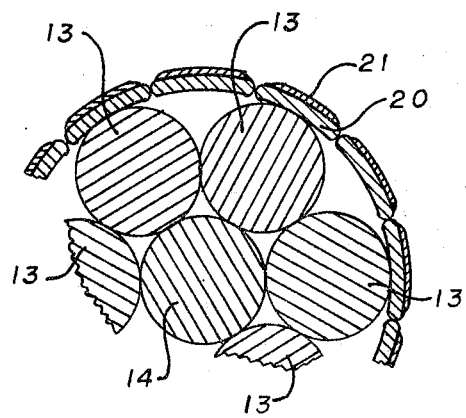
FIG. 4 illustrates a cross-sectional view of another multistrand conductor embodying this invention.

The embodiment illustrated in FIG. 4 shows an even further modification of the invention. In the embodiment of FIG. 4, inside strands 13 and center strand 14 are prepared as a twisted cable as described with reference to FIGS. 2 and 3. A skin element consisting of two segments is shown surrounding the twisted cable. The skin element is in the form of a ribbon, preferably spirally wrapped around the bundle of wires, and the skin portion consists of a high resistivity portion 21 clad onto a less high resistivity portion 20. The element 20 of the skin may be an electrical conductor of the same conductivity as conductors 13 or it may be of higher resistivity, but not as high as the resistivity of the portion 21. By selection of materials, the attenuation of radio frequency currents may be accomplished in two phases, to some degree in the portion 20 of the skin and to a greater degree in the portion 21.

Figure 5:
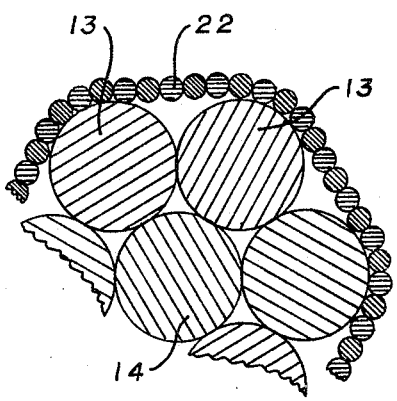
FIG. 5 illustrates a cross-sectional view of another multistrand conductor embodying this invention.

The embodiment illustrated in FIG. 5 again shows inner strands 13 and center strand 14 of a twisted cable which is surrounded by one or a group of high resistivity wires wrapped, preferably spirally and in peripheral contact, around the exterior of conductors 13. Again, the wires 22 constitute a skin of high resistivity and electrical continuity through which radio frequency currents will travel and be attenuated over a short length of cable.

Figure 6:
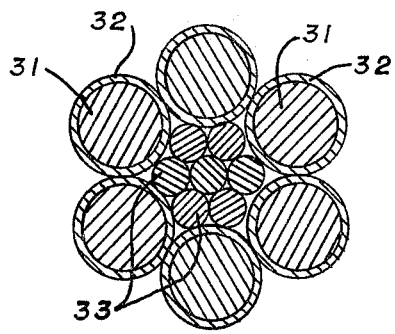
FIG. 6 illustrates a cross-sectional view of another multistrand conductor embodying this invention.

The embodiment illustrated in FIG. 6 shows a twisted cable consisting of electrical conductors 31, each of which is surrounded by a skin 32 of relatively high resistivity, which skin will attenuate radio frequencies. The conductive cable illustrated in FIG. 6 also shows central strands 33, which strands may be electrical conductor grade material supplied for transmitting power, or which may be steel, galvanized steel or high strength aluminum alloy which is supplied primarily to contribute strength to the cable and which may conduct little or no current.

Figure 7:
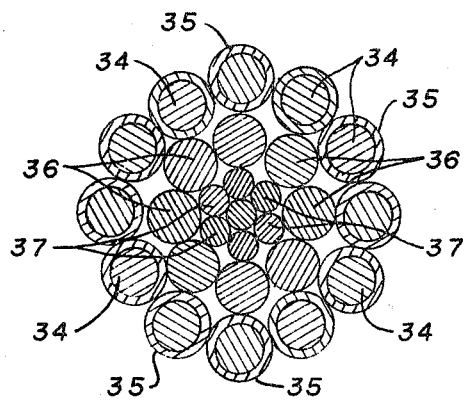
FIG. 7 illustrates a cross-sectional view of another multistrand conductor embodying this invention.

FIG. 7 illustrates still another embodiment of this invention. In FIG. 7 power conductors 34 are clad with skin element 35 of higher resistivity to attenuate radio frequency transmissions. The multistrand cable also consists of inner strands 36 and central strands 37. Inner strands 36 will comprise electrical conductor grade material and are supplied for the purpose of transmitting electrical power in the power frequency range, while the strands 37 may be steel or high strength aluminum alloy or electrical conductor grade metals depending upon whether they are provided to contribute strength to the line or more conductive material. The conductor cable illustrated in FIG. 7 shows a 27 strand cable and illustrates that this invention may be employed with conductors having any number of strands within the outer circle of strands and radio frequency attenuation will successfully be accomplished as long as the outer strands are bonded with a relatively high resistivity skin or as long as the entire conductor is surrounded with such relatively high resistivity skin.

Figure 8:
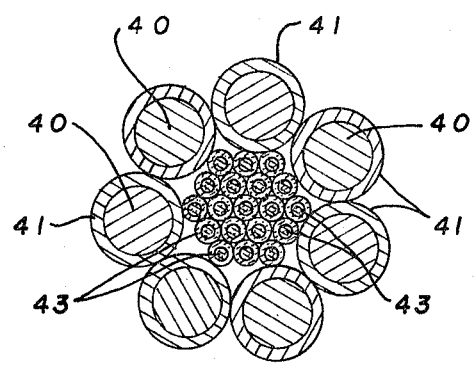
FIG. 8 illustrates a cross-sectional view of another multistrand conductor embodying this invention.

Finally, FIG. 8 illustrates still another embodiment of this invention wherein conductors 40 are clad with relatively high resistivity material 41 and formed into a twisted cable around a paper rope core 43 which is provided to increase the overall diameter of the cable thereby lowering its critical voltage gradient.

As stated heretofore, the embodiments of this invention illustrated in FIGS. 1–8 are considered to be exemplary of the invention, and the variety of embodiments herein illustrated indicates that the invention lends itself to a large number of specific designs.

What is claimed is:

1. An electrical power transmission conductor comprising a core member including multiple strands of electrical conductor grade of aluminum and an outer layer surrounding said core member of a material of relatively higher resistivity than said electrical conductor grade of aluminum, said material of said outer layer having an electrical conductivity between 10 and 60% of said core member and being electrically continuous and in intimate electrical contact with said core member throughout the length thereof and having a thickness sufficient to carry and to attenuate substantially all of the radio frequency currents associated with the power transmission.

2. The conductor defined in claim 1 in which said core member includes at least one strand of a high strength reinforcing material.

3. An electrical power transmission conductor comprising a core member including multiple strands of electrical conductor grade of aluminum and an outer layer surrounding said core member comprised of multiple strands of electrical conductor grade of aluminum, each strand provided with a layer of an aluminum alloy having an electrical conductivity between 10% and 60% of the core member and being electrically continuous and in intimate electrical contact with said core member throughout the length thereof and having a thickness sufficient to carry and to attenuate substantially all of the radio frequency currents associated with the power transmission.

4. An electrical power transmission conductor comprising a core member including strands of electrical conductor grade of aluminum and of high strength reinforcing material and an outer layer surrounding said core member comprised of multiple composite strands of electrical conductor grade of aluminum integrally clad with an aluminum alloy of substantially higher resistivity than said electrical conductor grade of aluminum, said cladding having an electrical conductivity between 10% and 60% of said core member and being in a thickness sufficient to carry and to attenuate substantially all of the radio frequency currents associated with the power transmission.

References Cited by the Examiner
UNITED STATES PATENTS

| | | | |
|---|---|---|---|
| 1,624,065 | 4/1927 | Osnos | 174—126 |
| 1,691,869 | 11/1928 | Fowle. | |
| 2,217,284 | 10/1940 | Lunt. | |
| 2,396,734 | 3/1946 | Williams | 174—128 |

FOREIGN PATENTS 314,340   2/1930   Great Britain.

LARAMIE E. ASKIN, *Primary Examiner.*

JOHN F. BURNS, *Examiner.*

D. A. KETTLESTRINGS, *Assistant Examiner.*